July 16, 1968  J. E. H. WESTBERG  3,392,579
PROPORTIONAL FLOWMETER

Filed Oct. 1, 1965  2 Sheets-Sheet 1

INVENTOR
JOHAN E. H. WESTBERG

BY Larson and Taylor

ATTORNEYS

July 16, 1968  J. E. H. WESTBERG  3,392,579
PROPORTIONAL FLOWMETER

Filed Oct. 1, 1965  2 Sheets-Sheet 2

INVENTOR
JOHAN E.H. WESTBERG

BY Larson and Taylor

ATTORNEYS

United States Patent Office 3,392,579
Patented July 16, 1968

3,392,579
PROPORTIONAL FLOWMETER
Johan Eric Hayden Westberg, Lidingo, Sweden, assignor to AGA Aktiebolag, Lidingo, Sweden, a corporation of Sweden
Filed Oct. 1, 1965, Ser. No. 492,151
Claims priority, application Sweden, Dec. 10, 1964, 14,930/64; Aug. 11, 1965, Ser. No. 10,467/65
5 Claims. (Cl. 73—196)

ABSTRACT OF THE DISCLOSURE

A proportional flowmeter having a chamber provided with inlets for the gases to be mixed includes a movable vane for dividing the chamber in accordance with the quantity of gas entering the inlets. The vane similarly divides an annular slot which connects the chamber to a mixing space having an outlet for the mixed gases, the length of the portions of the slot so divided corresponding to the quantity of flow therethrough.

---

Figure 1:
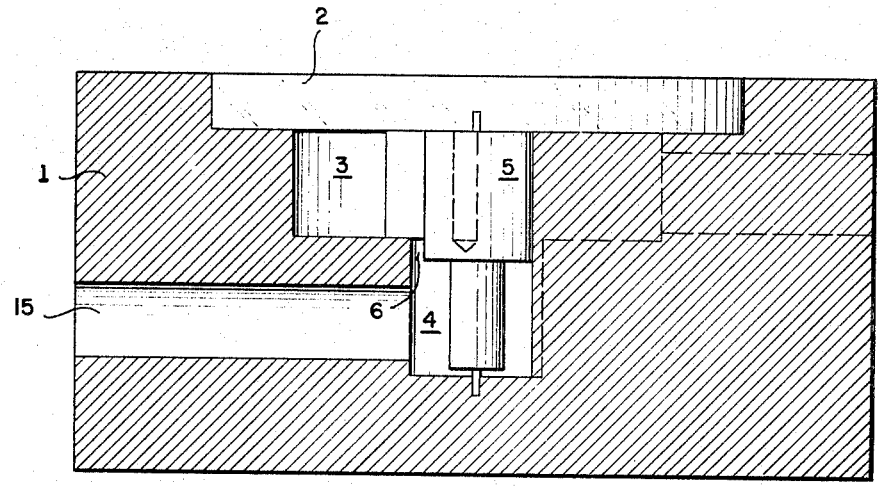

For various purposes, such as in the administration of gases to divers or to a patient during narcosis, it may be of importance to indicate accurately the relative amounts of a plurality of supplied gases. Also in the case of other media that are mixed with each other, such as liquids, the same problem is present.

The invention relates to a proportional flowmeter having a chamber with inlets prepared for a plurality of media to be mixed and connected by a slot with a mixing space, a movable member being provided in the chamber so as to divide it and the slot into portions each of which is connected with a corresponding inlet. Proportional flowmeters of this type are previously known. One such meter comprises a pair of parallel tubes communicating through a slot of uniform width. A ball is movable in the one tube and the two media are supplied each to one end of this tube and pass through the slot into the other tube, from which the mixture is taken off. If the tubes are accurately horizontal, the ball fits tightly and the slot is narrow enough to provide sufficient pressure differences between the tubes, the ball will adjust itself so as to divide the slot into two portions in the same proportion as that of the mixture. An example of such a meter may be found in U.S. Patent 1,947,923.

This type of meter has several drawbacks. First, it requires accurate levelling, which is often difficult to achieve, for instance on a ship, second, the slot must be of the same length as the range of indication, so that it must be very thin if the quantities of flow are small. The meter will also be bulky, since its length must be larger than the indicating range that is required to provide sufficient accuracy.

The proportional flowmeter according to the invention is free from the drawbacks of the prior arrangement and has the further advantage of adapting itself easily to a greater number of media than two. The essential feature of the invention consists in the use of at least one movable member which is turnable on an axis, the chamber being of an annular shape corresponding to that of the movable member.

Figure 2:
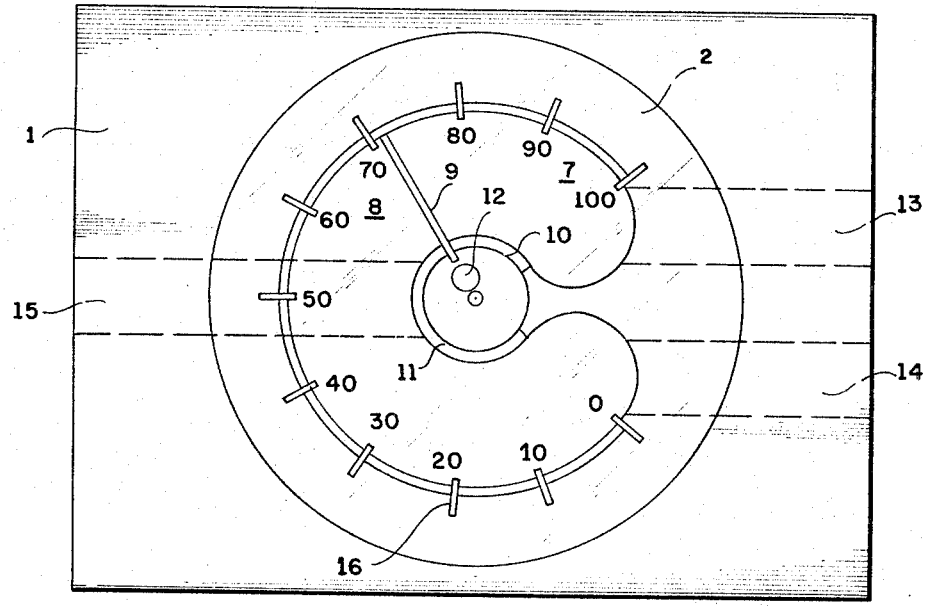
Figure 3:
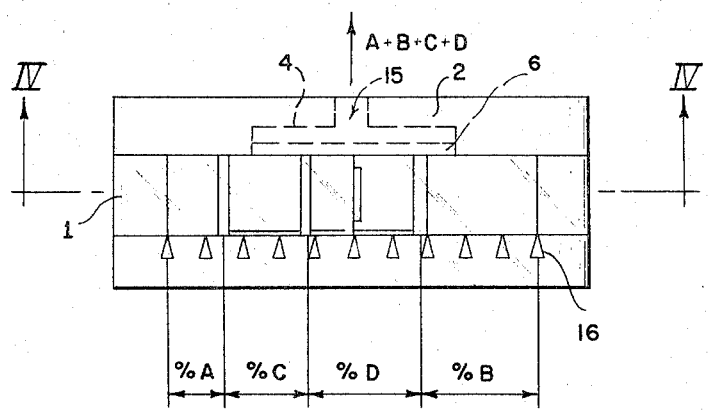
Figure 4:
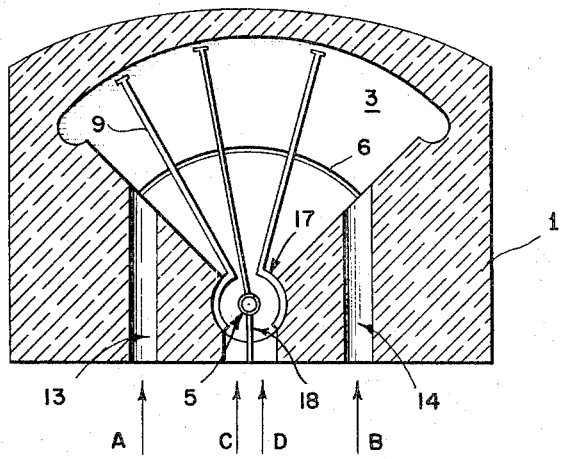

Embodiments of the invention are shown on the drawing, in which:

FIG. 1 is a cross sectional view,
FIG. 2 a top view of a first embodiment adapted for two media, and
FIG. 3 is a front view of a meter for four media and
FIG. 4 is a section taken on the line IV of FIG. 3.

The meter shown in FIGS. 1 and 2 comprises a housing 1 having a transparent cover 2 bounding a chamber 3, below which there is provided a mixing space 4. The chamber 3 is separated from the mixing space 4 by a movable member in the form of a turnable drum 5. Between the drum and the wall of the mixing space 4 there is formed a slot 6. The chamber 3 is divided into two portions 7 and 8 by a vane 9 which is supported by the drum 5 and fits tightly in the chamber 3. In a corresponding manner the slot 6 is divided by the vane in two portions 10 and 11, as is apparent from FIG. 2. A boring 12 is provided in the drum 5 to compensate for the weight of the vane, thereby making the movable member balanced. The media to be mixed enter the chamber 3 through inlets 13 and 14, which are arranged so as to make the chamber portions 7 and 8 and the slot portions 10 and 11 communicate each with a corresponding one of the inlets 13 and 14. The media flow through the slot into the mixing space 4 and leave it through an outlet 15. A scale 16 is graduated in percent of the medium entering through the inlet 14.

Operation of meter of FIGS. 1 and 2

The vane 9 adjusts itself so as to have equal pressures on both sides. There is then the same pressure differential across both of the slot portions 10 and 11, since the mixing space 4 has a certain pressure, and the quantity of flow through the corresponding slot portion is proportional to its length.

The annular arrangement of the slot and the chamber makes it possible to have a small meter for a required accuracy of measurement. Furthermore, the slot 6 can be made short enough so that it does not have to be extremely narrow to provide sufficient pressure differential, even if the quantities of flow are relatively small. The central placement of the slot enables the latter to be made short in spite of the fact that the vane 9 travels along a substantially longer scale.

Description of meter of FIGURES 3 and 4

This embodiment is substantially similar to the foregoing one and differs chiefly in that there are provided in the chamber a plurality of movable members, specifically three, by which the chamber and the slot are subdivided into a number of portions, each of which is connected with a corresponding inlet. Corresponding reference numbers have been used for details corresponding to the embodiment of FIGS. 1 and 2.

The housing 1 has a cover 2 and is provided with a chamber 3 communicating through the slot 6 with a mixing tube 4 provided in the cover 2. A centrally disposed supporting member 5 carries a plurality of vanes 9 subdividing the chamber 3 into four portions. Of these, the two lateral ones are connected with inlets 13 and 14 for a pair of media A and B. The intermediate two chamber portions however communicate with a central portion of the chamber 3, in which terminate similar inlets for a pair of additional media C and D. To prevent the media from mixing with each other, the outermost pair of vanes 9 carry slides 17, whereas the middle vane 9 extends to the supporting member 5 and is continued by a partition 18 preventing the media C and D from mixing.

From the mixing space 4 the media pass through an outlet 15. A scale 16 is provided for reading off purposes.

The operation of this embodiment is completely analogous to that of the first embodiment, the only difference being that a larger number of media are handled by the meter.

I claim:
1. Proportional flowmeter comprising a housing having a chamber with inlets provided for a plurality of gases to be mixed with each other and an outlet for the mixed gases, at least one movable member arranged in the chamber, said member dividing the chamber into an inlet portion and a mixing and outlet portion and forming a slot connecting said parts, said movable member comprising a drum mounted axially in bearings inside the chamber and a vane fixed to the drum and dividing the inlet portion of the chamber and the slot into a plurality of portions, each one of said portions being connected with a corresponding inlet, the size of portions as determined by the position of the said vane being proportional to the quantity of gas entered therein and a scale for cooperating with the vane for indicaing the proportions between the different portions.

2. Proportional flowmeter according to claim 1 further comprising a transparent housing member bounding the chamber and a scale for cooperating with the vane to show the proportions between the different portions of the chamber.

3. Proportional flowmeter according to claim 2 wherein said housing is of solid one-piece construction having a chamber and a plurality of bores formed therein, and said inlets comprise a pair of bores in said housing and said outlet comprises a bore in said housing, said inlets being located above said outlet and being connected thereto by a slot and mixing space formed between said drum and a cylindrical bore in said housing.

4. Proportional flowmeter according to claim 1 having a plurality of movable members and inlets, of which at least one inlet communicates with a corresponding portion of the chamber through an aperture between the vanes at the axis of the chambers.

5. Proportional flowmeter according to claim 4 wherein a pair of inlets communicate with corresponding chambers, said pair of inlets being separated by one of said vanes and by a partition member connected to said drum.

References Cited
UNITED STATES PATENTS

| | | | |
|---|---|---|---|
| 1,747,536 | 2/1930 | Aernout | 73—196 |
| 1,947,923 | 2/1934 | Schweitzer | 73—196 |
| 2,889,707 | 6/1959 | Snider | 73—228 |

RICHARD C. QUEISSER, *Primary Examiner.*

E. D. GILHOOLY, *Assistant Examiner.*